(12) United States Patent
Obinata et al.

(10) Patent No.: US 6,987,716 B2
(45) Date of Patent: Jan. 17, 2006

(54) VARIABLE SPEED DISK DRIVE AND METHOD OF CONTROLLING THE DISK DRIVE FROM RECORDED DRIVE-SPEED FORMAT INFORMATION

(75) Inventors: Masaki Obinata, Kanagawa-ken (JP); Arimasa Naitoh, Kanagawa-ken (JP); Masaharu Itoh, Kanagawa-ken (JP); Yasuhiro Horiuchi, Kanagawa-ken (JP)

(73) Assignee: International Business Machines Corp, Armonk, NY (US)

( * ) Notice: Subject to any disclaimer, the term of this patent is extended or adjusted under 35 U.S.C. 154(b) by 612 days.

(21) Appl. No.: 10/066,128

(22) Filed: Jan. 31, 2002

(65) Prior Publication Data

US 2002/0176337 A1 Nov. 28, 2002

(30) Foreign Application Priority Data

Jan. 31, 2001 (JP) ....................... 2001-023391

(51) Int. Cl.
G11B 7/60 (2006.01)

(52) U.S. Cl. ................. 369/47.38; 369/53.2; 369/53.22
(58) Field of Classification Search .............. 369/47.39, 369/47.38, 47.1, 53.1, 53.2, 53.22, 53.21
See application file for complete search history.

(56) References Cited

U.S. PATENT DOCUMENTS

| 4,697,127 A | | 9/1987 | Stich et al. | |
|---|---|---|---|---|
| 5,764,610 A | * | 6/1998 | Yoshida et al. | .......... 369/53.22 |
| 6,704,269 B1 | * | 3/2004 | Ogawa | ....................... 369/116 |

FOREIGN PATENT DOCUMENTS

| JP | 58-131465 | 9/1983 |
|---|---|---|
| JP | 61-170959 | 8/1986 |
| JP | 03-273424 | 12/1991 |
| JP | 03-273425 | 12/1991 |
| JP | 05-225683 | 9/1993 |
| JP | 07-121974 | 5/1995 |
| JP | 07-176137 | 7/1995 |
| JP | 07-210975 | 8/1995 |
| JP | 07-220448 | 8/1995 |
| JP | 07-235126 | 9/1995 |
| JP | 08-321043 | 12/1996 |
| JP | 10-134500 | 5/1998 |
| JP | 11-003219 | 1/1999 |
| JP | 11-306661 | 11/1999 |
| JP | 2000-339821 | 12/2000 |

OTHER PUBLICATIONS

Nobuyuki Abe, "Arena of New Configuration," DOS V magazine, vol. 7, No. 23, Dec. 1, 1998, pp. 312–315, 368.

Hideo Sano, "Optical Disk Device Control" Technical Journal Published by Inventors Association, Publication No. 95–900, Jan. 17, 1995. (English translation accompanies article in Japanese).

* cited by examiner

Primary Examiner—Nabil Hindi
(74) Attorney, Agent, or Firm—Richard Goldman

(57) ABSTRACT

A disk drive includes an information processor 15 for reading out or writing information from or to the disk drive, a disk drive unit 11 for driving a disk 10, an access unit 12 for reading out or writing information from or to the disk 10, and a controller 13 for controlling the disk drive unit 11, and a disk controller 14. The disk drive is driven at a set drive speed. Format identification information is acquired from information recorded on the disk 10, and drive-speed information for the disk drive, determined from the acquired format identification information, is transmitted to control the speed of the disk.

7 Claims, 11 Drawing Sheets

| Media type | Information format | Access quantity (Mbps) | Drive speed |
|---|---|---|---|
| DVD | Video (MPEG-2) | 0~22.16 | 2x (11.08Mbps) |
| DVD | Audio (MPEG-4) | . . . | . . . |
| DVD | Audio (MPEG-7) | . . . | . . . |
| DVD | ROM | 55.4~88.64 | 8x (88.64Mbps) |
| DVD | RAM | . . . | . . . |
| . . . | . . . | . . . | . . . |
| CD | | | |

| Media type | Information format | Drive speed |
|---|---|---|
| | | |
| DVD | Video(MPEG-2) | 1x (11.08Mbps) |
| DVD | Audio(MPEG-4) | |
| DVD | Audio(MPEG-7) | |
| DVD | RAM | |
| DVD | ROM | 8x (88.64 Mbps) |
| ... | ... | ... |
| CD | ROM | |

FIGURE 3

| Media type | Information format | Access quantity (Mbps) | Drive speed |
|---|---|---|---|
| DVD | Video (MPEG-2) | 0~22.16 | 2x (11.08Mbps) |
| DVD | Audio (MPEG-4) | ... | ... |
| DVD | Audio (MPEG-7) | 55.4~88.64 | 8x (88.64Mbps) |
| DVD | ROM | ... | ... |
| DVD | RAM | | |
| ... | ... | | |
| CD | | | |

FIGURE 7

VARIABLE SPEED DISK DRIVE AND METHOD OF CONTROLLING THE DISK DRIVE FROM RECORDED DRIVE-SPEED FORMAT INFORMATION

TECHNICAL FIELD

The present invention relates to a method of controlling a disk drive, and more particularly to a disk drive control method, a disk drive, an information processor including the disk drive, and a program for controlling the disk drive.

BACKGROUND OF THE INVENTION

Presently, various forms of disk drives have been used in information processors such as computers, etc. Among the disk drives, the disk drive for driving optical disks is required to drive various kinds of optical disks such as a compact disk (hereinafter referred to as a CD), a digital versatile disk (hereinafter referred to as a DVD), etc.

There are cases where the DVD, because of its high recording density and reading and writing rates, is used as a DVD player, which uses a DVD such as a DVD-Video, a DVD-Audio, etc., or storage means such as a DVD-RAM, a DVD-ROM, DVD-RW, etc. There are provided applications at various access speeds and drive speeds.

In conventional optical disk drives, in order to meet the above-mentioned various drive speeds, an initialization drive speed, for example, can be set in three modes: a high performance mode, a normal mode, and a silent mode. For instance, in the high performance mode, the disk drive is always driven at the high drive speed of the drive speeds provided in the disk drive, for example, the 8-time speed. In the normal mode, the disk drive is set so that it is driven at the high speed when accessed and that it is driven at low speed if there is no access within a predetermined time. In the silent mode, the disk drive is set so that it is always driven at a low speed, such as a 1-time drive speed and a 2-time drive speed.

If the disk drive is initialized in the high performance mode or normal mode, read and write operations can be satisfactorily performed regardless of the format in which blocks of data bytes are recorded along a track. However, there will arise a problem that the high rotational speed of hard disks will make noise conspicuous and power consumption great. Although this problem can be solved if the initialization is performed in the silent mode, it is not sufficient for media where a higher drive speed is suitable, because the setting has to be changed each time an initialization is made. Particularly, the demand for power-saving becomes important in the case where a battery-powered information processor, such as notebook-sized type, laptop type, and other portable type information processors, has a limit to an energy resource.

In an optical disk system having interchangeability between different optical disks, there have hitherto been proposed a method of automatically discriminating disks and a method of canceling noise in image data which is reproduced at a variable rate. For example, Published Unexamined Patent Application No. 9-198780 discloses an optical system equipped with a method of automatically discriminating disks. In the method disclosed in the above-mentioned Published Unexamined Patent Application No. 9-198780, the cycle of an information signal reproduced from a disk is detected to discriminate a DVD and a CD. When it is higher than a reference value, the disk is judged to be a DVD. On the other hand, when it is lower than the reference value, the disk is judged to be a CD.

However, this method is capable of discriminating between a CD and a DVD, but cannot provide a drive speed corresponding to information recorded on the DVD. Thus, the method is not suitable for solving the aforementioned problem of noise and power consumption.

Furthermore, Published Unexamined Patent Application No. 10-210420 discloses a method of suitably canceling noise in image data reproduced at a variable rate. However, this method is not a method suitable for solving the aforementioned problem of noise and power consumption.

SUMMARY OF THE INVENTION

Accordingly, it is an object of the present invention to provide a disk drive control method, a disk drive, an information processor including the disk drive, and a disk drive control program, which are capable of providing an optimum drive speed in accordance with disk type, for example, a DVD player which can be driven at low speed, when a CD and a DVD are driven by the same disk drive.

Another object of the present invention is to provide a disk drive control method, a disk drive, an information processor, and a disk drive control program, which are capable of reducing noise and power consumption.

In accordance with the present invention, there is provided a method of controlling a disk drive, which includes driving the disk drive at a set drive speed; acquiring format identification information from information recorded on the disk; and transmitting drive-speed information for the disk drive, determined from the acquired format identification information.

The drive speed may be set by using a look-up table in which the format identification information and the drive-speed information are correlated with each other. The look-up table can be included in the information processor. The step of setting the drive speed of the disk drive may include a step of transmitting the drive-speed information, determined by using the look-up table, from the information processor to the disk controller. The look-up table may be included in the disk controller. In the present invention, the step of setting the drive speed of the disk drive can include a step of determining the drive-speed information from a quantity of accessing the disk by use of the look up table. In the present invention, it is preferable that the disk drive be an optical disk drive.

For a fuller understanding of the nature and advantages of the present invention, reference should be made to the following detailed description taken together with the accompanying figures.

DESCRIPTION OF THE DRAWING

FIG. 3 is a diagram showing a media corresponding table that is used for driving the disk drive shown in FIG. 1.

FIG. 7 is a diagram showing a media corresponding table that is used to drive the disk drive shown in FIG. 5.

DETAILED DESCRIPTION OF THE INVENTION

Figure 1:
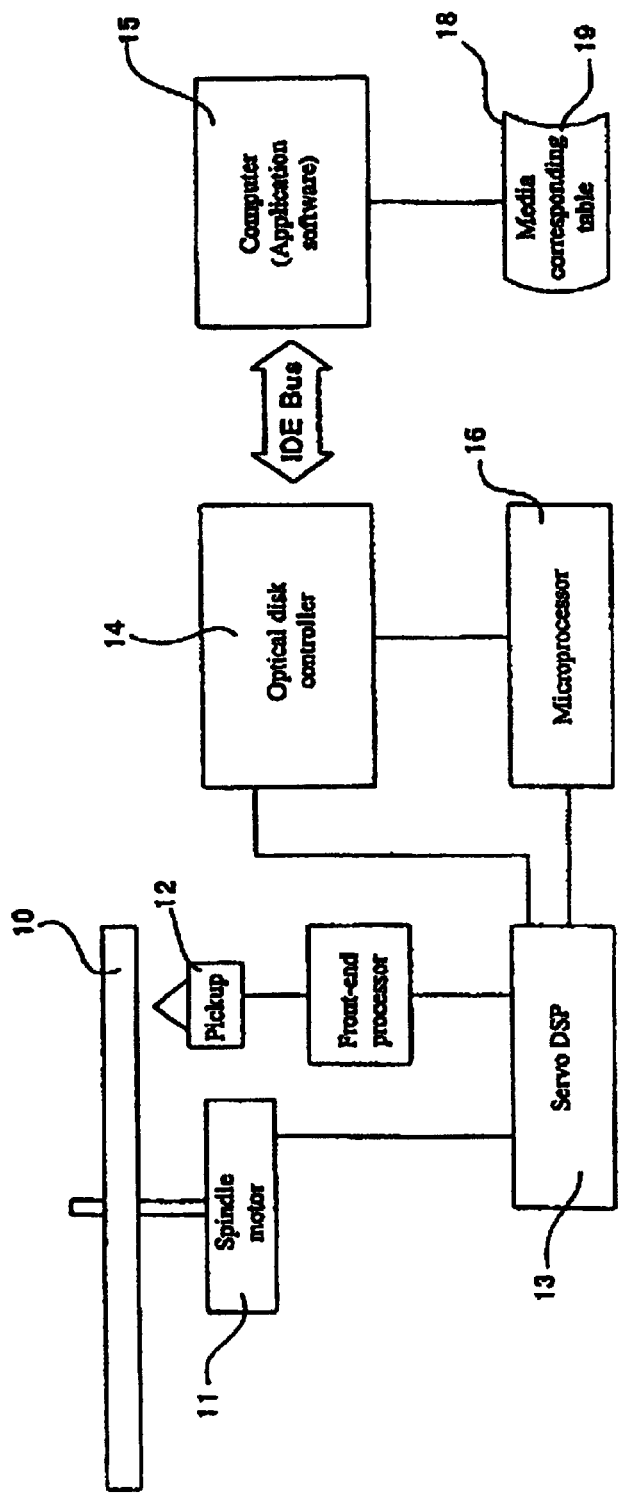
FIG. 1 is a schematic block diagram showing a disk drive of a first embodiment of the present invention.

The present invention will be described with reference to preferred embodiments shown in the drawings. However, the present invention is not to be limited to the embodiments shown in the drawings. The present invention will hereinafter be explained with reference to a disk drive for performing read and write operations on an optical disk. FIG. 1 is a block diagram showing a disk drive of a first embodiment of the present invention. The disk drive shown in FIG. 1 is employed as disk drive means for driving an optical disk 10 such as a CD, a DVD, etc. The disk drive includes a spindle motor 11, a pickup 12 employed as access means for reading out or writing information from or to the optical disk 10, and a servo DSP 13 employed as drive control means for performing control in response to a signal from the spindle motor 11 and pickup 12.

As shown in FIG. 1, the servo DSP 13 sends a signal obtained from the optical disk 10, to an optical disk controller 14. Also, the optical disk controller 14 controls the spindle motor 11, the pickup 12, and the servo DSP 13 by the microprocessor 16. The optical disk controller 14 processes the signal, read out from the optical disk 10, and sent from the servo DSP 13, and sends the process signal to a computer 15 used as an information processor through a suitable bus such as an IDE bus. The microprocessor 16 is connected to the optical controller 14 and the servo DSP 13 and decodes the signal sent from the optical disk 10, and proper processing is performed.

In the first embodiment of the present invention shown in FIG. 1, the microprocessor 16 is constructed separately from the optical disk controller 14. However, in the present invention, the microprocessor 16 may be included either in the optical disk controller 14 or in the servo DSP 13, as long as it can appropriately provide the function of decoding signals.

The computer 15, which is used as the information processor shown in FIG. 1, contains application software 17 for performing various processes by the use of information read out from the optical disk 10. The computer 15 causes the application software 17 to execute a predetermined operation by the use of information recorded on a medium such as a CD, a DVD, etc., as appropriate. The computer 15 that is used in the present invention is not limited to a special type, but may be any means, as long as it includes a central processing unit (CPU) capable of performing information processing. For example, it may be a work station, a desktop personal computer (PC), a laptop PC, a notebook-sized PC, a portable information processor, etc.

The application software 17 that can be used in the present invention is not limited to a special type, but may be any application software, as long as data is suitably read or written according to purposes. For instance, it may be a CD-ROM, a DVD-ROM, a DVD-RAM, a DVD-Video, a DVD-Audio, a DVD-RW, etc.

The computer 15 includes storage means 18 so that it can execute the application software 17. The storage means 18 consists of a ROM, a RAM, a hard disk, flash memory, etc. The storage means 18 of the computer 15 has stored a media corresponding table 19. This media corresponding table 19 is used as a look-up table for judging the drive speed of a disk drive, including format identification information relating to the format of the optical disk 10, etc.

The format identification information that can be used in the present information, in addition to format identification information written for the purpose of identification to an optical disk, can employ format identification information that corresponds to a specific format given by the application software 17 on the basis of the analysis of the information read out from the optical disk 10. Besides, the present invention can employ any type of information if it can accurately specify a format in which data is recorded. For example, it may be frequency for detecting data bits.

Figure 2:
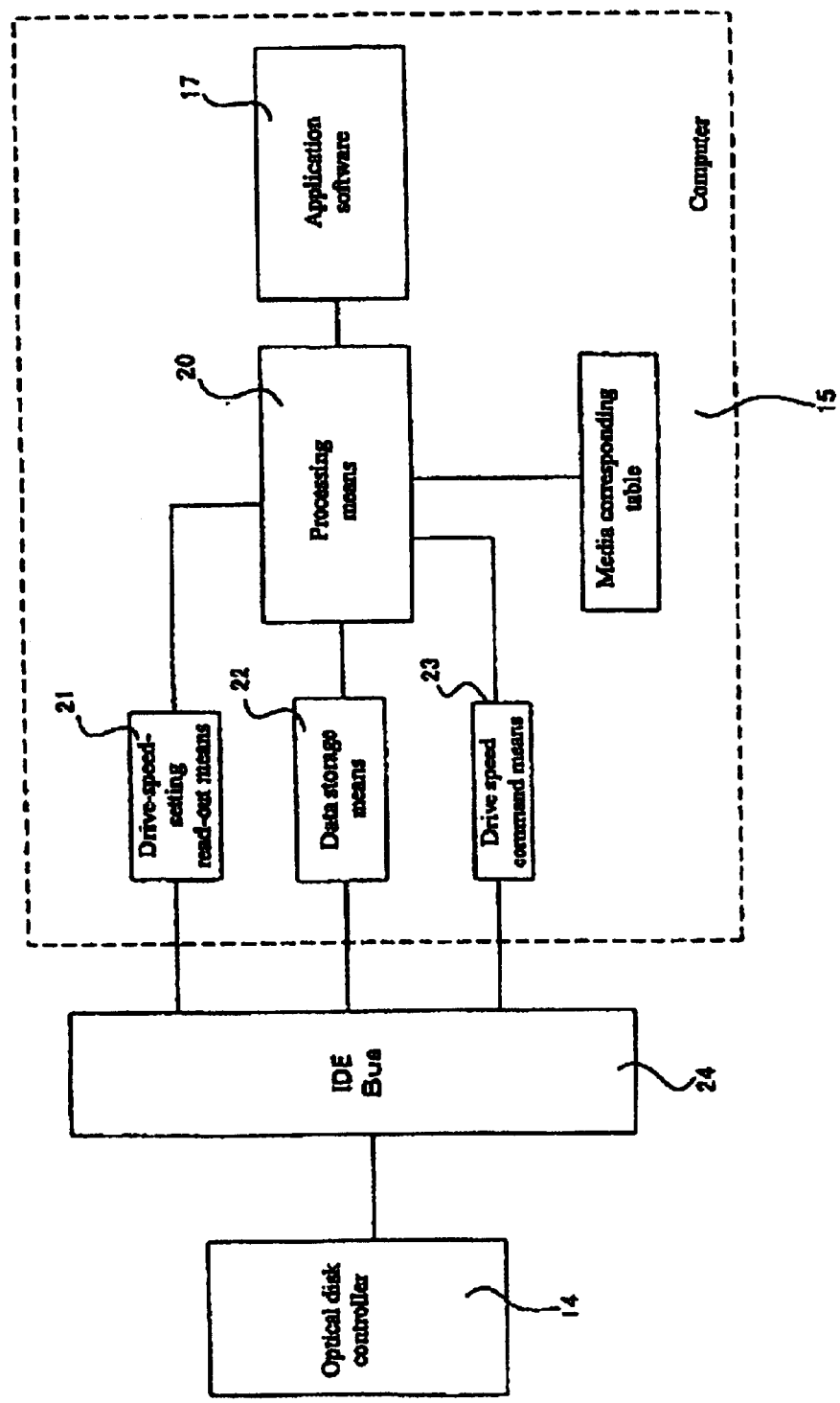
FIG. 2 is a detailed block diagram of a computer shown in FIG. 1.

FIG. 2 is a block diagram showing the construction of the computer 15 that is the information processor of the present invention. The computer 15 shown in FIG. 2 includes processing means (CPU) 20, drive-speed-setting read-out means 21, data storage means 22 for storing data read out from the optical disk, and drive-speed command means 23 for giving a signal for controlling the drive speed of the disk drive. Signals are transmitted and received between (1) the drive-speed-setting read-out means 21, the data storage means 22, and the drive-speed command means 23, and (2) the optical disk controller 14 through the IDE bus 24.

The processing means 20 operates the application software 17 that uses a signal from the optical disk 10. The application software 17 accesses the media corresponding table 19 stored on the storage means 18 to determine an optimum drive speed for information recorded on the optical disk 10 from the format identification information, and transmits the determined speed to the disk drive as a drive speed command signal, through the processing means 20 and the drive speed command means 23. The computer 15 of FIG. 2 and the optical disk controller 14 of the disk drive are connected by the IDE bus 24 so that information from the optical disk 10 is transmitted and received to control the drive of the optical disk drive by the application software 17.

FIG. 3 is a diagram showing the data configuration of the media corresponding table 19, which is used in the disk drive control method of the first embodiment of the present invention as the look-up table for controlling and driving the disk drive. The media corresponding table 19 shown in FIG. 3 has a media type field 19a, a information format field 19b, and a drive speed field 19c in which corresponding drive speeds are prescribed. The media type filed 19a prescribes media types (DVD or CD). In the information format field 19b, blocks of data bytes are disposed according to different formats. For example, in the case of a DVD, video, audio, RAM, ROM, and RW are prescribed.

In the drive speed field, a drive speed is prescribed for each information format. For instance, in FIG. 3, in the case of DVD-video for reading out information recorded in the MPEG-2 format, the drive speed is correlated with a 1-time speed (11.08M bits/s in data transmission rate). However, the present invention is also capable of using a double speed (22.1 6M bits/s in data transmission rate) for the DVD-Video for reading out information recorded in the MPEG-2 format. In addition, the present invention is capable of employing different speeds for DVDs where data bytes are recorded in different information formats, for example, the MPEG-2, MPEG-4, MPEG-7 formats, as listed in FIG. 3.

Furthermore, in the case where the optical disk 10 is a DVD-ROM, as listed in FIG. 3, the drive speed is correlated with an 8-time speed (88.64M bits/s in transmission rate). Format identification information can be acquired or generated from information recorded on the optical disk 10, by using the media corresponding table 19 shown in FIG. 3. An Information format can be specified from the format identification information, and furthermore, a drive speed corresponding to the information format can be determined. The thus-determined drive speed information is sent to the drive speed command means 23 shown in FIG. 2 and to the optical disk controller 14 in order to drive the disk drive.

In order to judge the information format recorded on the optical disk 10, the above-mentioned format identification information can be used. In the case where a disk has media identification information, the information format can be judged by the media identification information. Also, while the disk is being rotated at the initial sampling rotation speed, the recorded information is analyzed, and the information format can be judged by the application software 17. In addition, in order to judge a CD and a DVD, the cycle of an information signal can be monitored and judged, as is known in the related arts.

Figure 4:
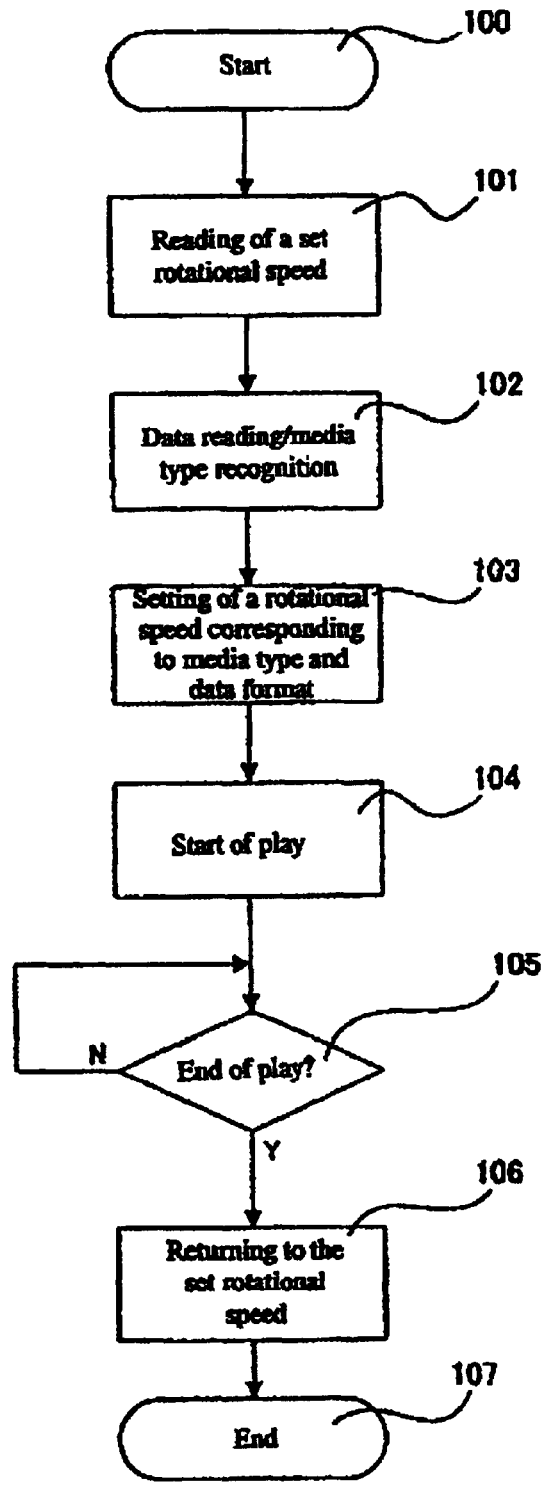
FIG. 4 is a flowchart for a first embodiment of the disk drive control method of the present invention.

FIG. 4 is a flowchart for a first embodiment of the disk drive control method of the present invention. The disk drive control method of the present invention shown in FIG. 4 starts with step 100. In step 101, the application software 17 included in the computer 15 reads out a rotational speed, initialized by a user, such as "high performance," "normal," and "silent," set by the user. The reading of the rotational speed in the initialization is performed for the purpose of returning the rotational speed to the high performance mode, normal mode, or silent mode, previously specified by the user, after the disk drive control method of the present invention has been terminated. The drive speed that is set by the user does not always need to be selected from the above-mentioned three modes. Any rotational speed can be adopted. For example, it may be the above-mentioned 1-time speed (11.08M bits/s). Or in the computer 15, it can be set beforehand to the most frequently used drive speed by the user.

In step 102, an identifier from the optical disk is read out by a predetermined command, or data reading is performed. Then, a signal read out on the side of the application software 17 is analyzed to obtain format identification information. In step 103, the medium type and the drive speed corresponding to the information format, which are determined by the media corresponding table 19, are transmitted to the optical disk controller 14 as a drive speed command signal by the drive speed command means 23 to control rotation of the optical disk 10. In this manner, an optimum rotational speed is given to the spindle motor 11.

Thereafter, in step 104, the application software 17 reads out information stored on the optical disk 10 at a suitable rotational speed and plays the read information according to a function such as a DVD player, etc. In step 105, it is judged whether or not information recorded on the optical disk 10 has ended, or whether or not there is an external input for the end of play by the user. In step 105, in the case where play is further continued (N), the process returns to step 104. In the case where the end of information recorded on the optical disk 10 is detected, or there is an external input for the end of play by the user (Y), play is ended. In step 106, the drive mode being used is returned to the setting of an initial drive speed, read first by the application software 17. In step 107, the disk drive control method of the present invention ends.

Figure 5:
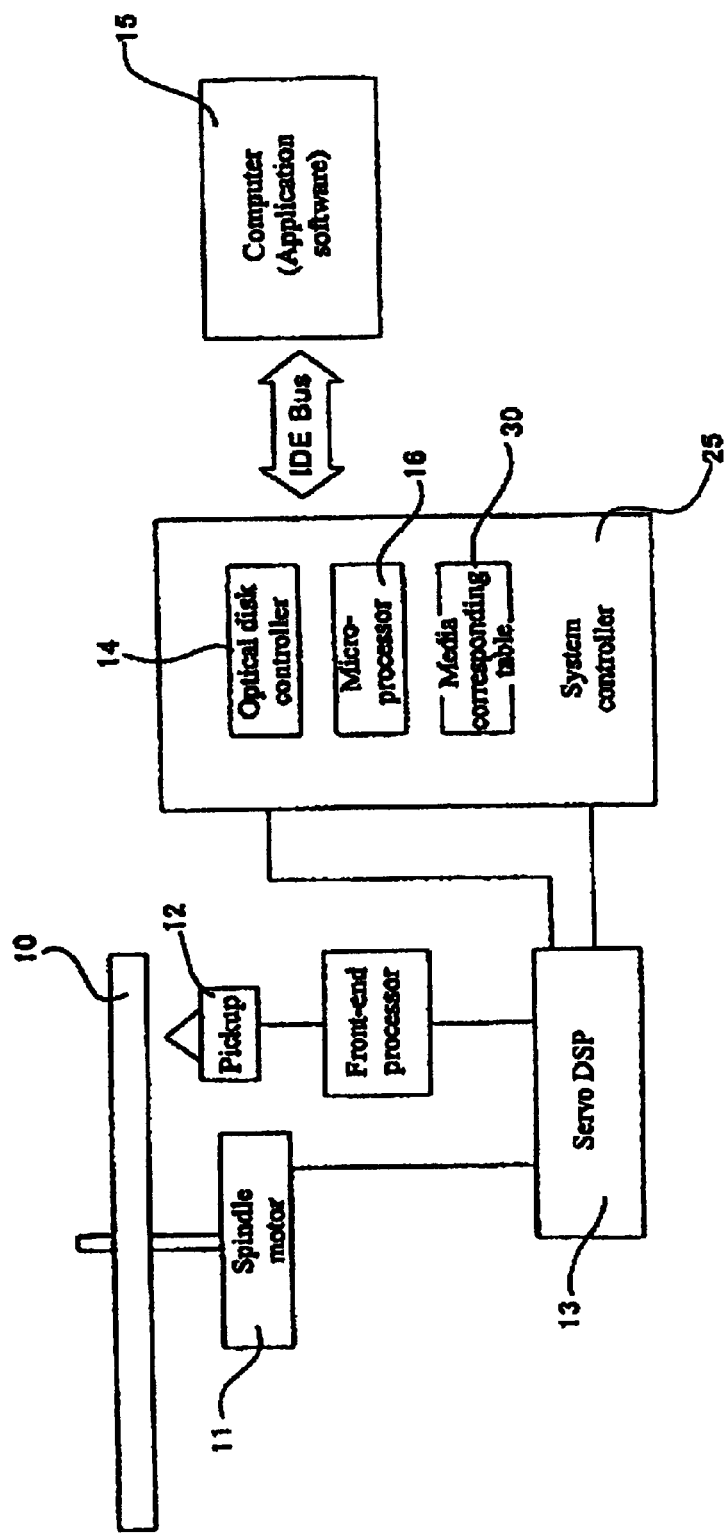
FIG. 5 is a schematic block diagram showing a disk drive of a second embodiment of the present invention.

FIG. 5 is a block diagram showing a second embodiment of the disk drive of the present invention. The disk drive of the present invention in FIG. 5 differs from the embodiment shown in FIG. 1 in that a media corresponding table 30 is included in the disk drive. Therefore, the disk drive is controlled without using the application software 17. The second embodiment of the disk drive of the present invention shown in FIG. 5 uses a system controller 25 that includes the functions of the optical disk controller 14 and the microprocessor 16 shown in FIG. 1. The system controller 25 shown in FIG. 5 monitors an amount of accessing the optical disk 10 and determines an optimum drive speed for driving the optical disk 10 by the access quantity.

Figure 6:
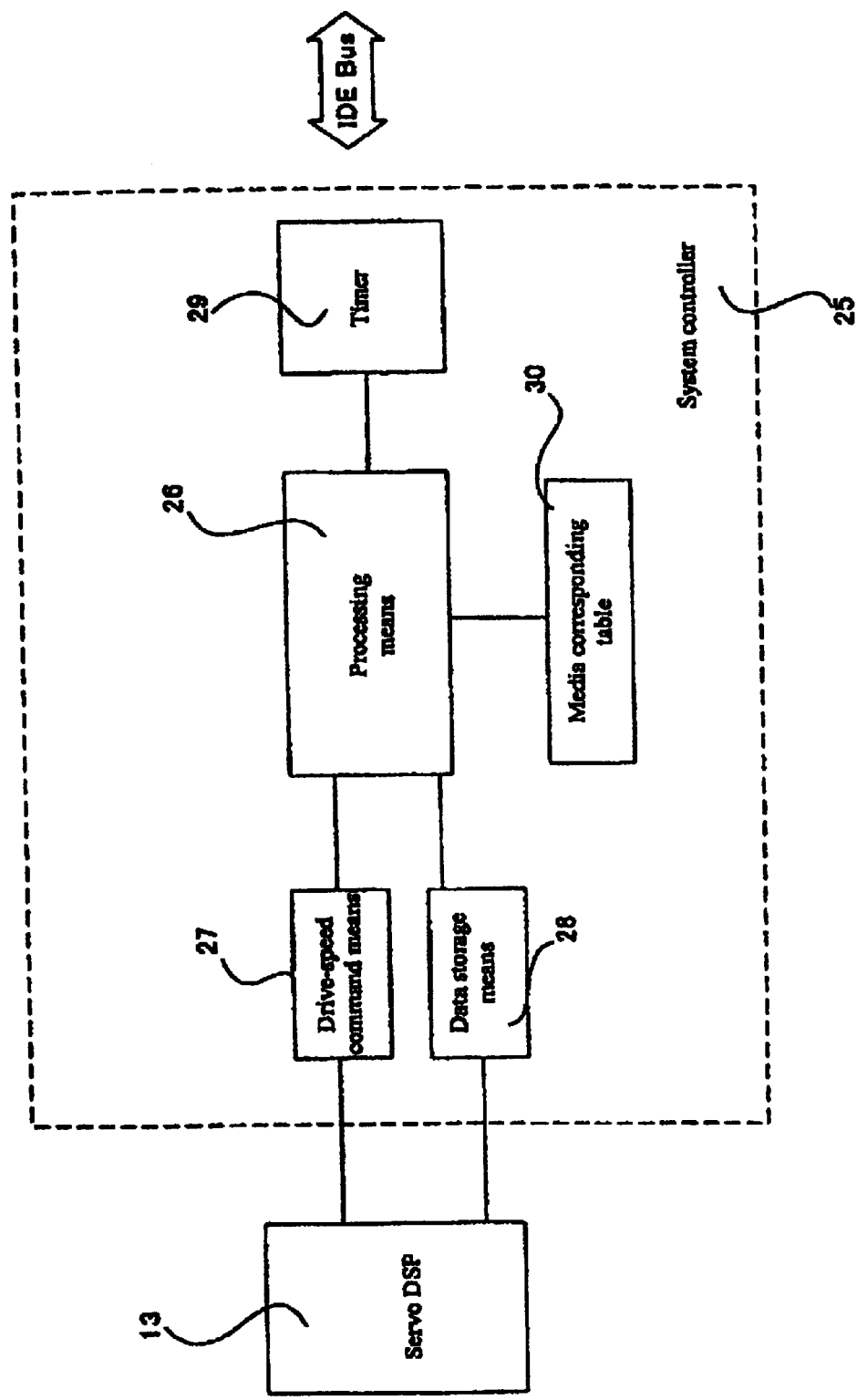
FIG. 6 is a detailed block diagram of a computer shown in FIG. 5.

FIG. 6 shows a detailed block diagram of the system controller 25 shown in FIG. 5. As shown in FIG. 6, the system controller 25 includes processing means (e.g., a CPU) 26, drive speed command means 27, data storage means 28, timer means 29, and a media corresponding table 30. The data storage means 28 reads out a signal from the access means 12 and transmits the signal to the processing means 26. A timer signal from the timer means 29 is transmitted to the processing means 26, and the processing means 26 counts the number of operations of accessing the optical disk 10 over a predetermined time interval and determines the access quantity. In the present invention, the access quantity can be used as the frequency of accesses which is obtained by dividing the access quantity by a predetermined time. The timer means 29 that can be used in the present invention can be constructed with software or hardware, and can also be selectively used as appropriate.

If the access quantity is determined, the processing means 26 determines an optimum drive speed, which corresponds to the determined access quantity, from the media corresponding table 30 and transmits a drive speed command signal, which corresponds to the optimum drive speed, to the servo DSP 13 through the drive speed command means 27. The drive speed command signal is transmitted to the servo DSP 13, and the spindle motor 11 is driven at the commanded rotational speed. Thus, it becomes possible to perform reproduction at an optimum drive rotation speed.

FIG. 7 is a diagram showing a media corresponding table 30 used in the second embodiment of the disk drive of the present invention. The media corresponding table 30 shown in FIG. 7 includes a media type field 30a, a information format field 30b, an access-quantity field 30c in which a detected access quantity is prescribed, and a drive speed field 30d in which a drive speed corresponding to an access quantity is prescribed. In the media corresponding table 30 shown in FIG. 7, a detected access quantity is correlated with a suitable drive speed that can correspond to the access quantity. In the second embodiment of the disk drive of the present invention, a drive speed is determined from an access quantity measured by the system controller 25, and the correspondence shown in FIG. 7 becomes possible. The drive is driven at the drive speed determined as described above, whereby the disk drive can be driven at an optimum drive rotation speed.

Figure 8:
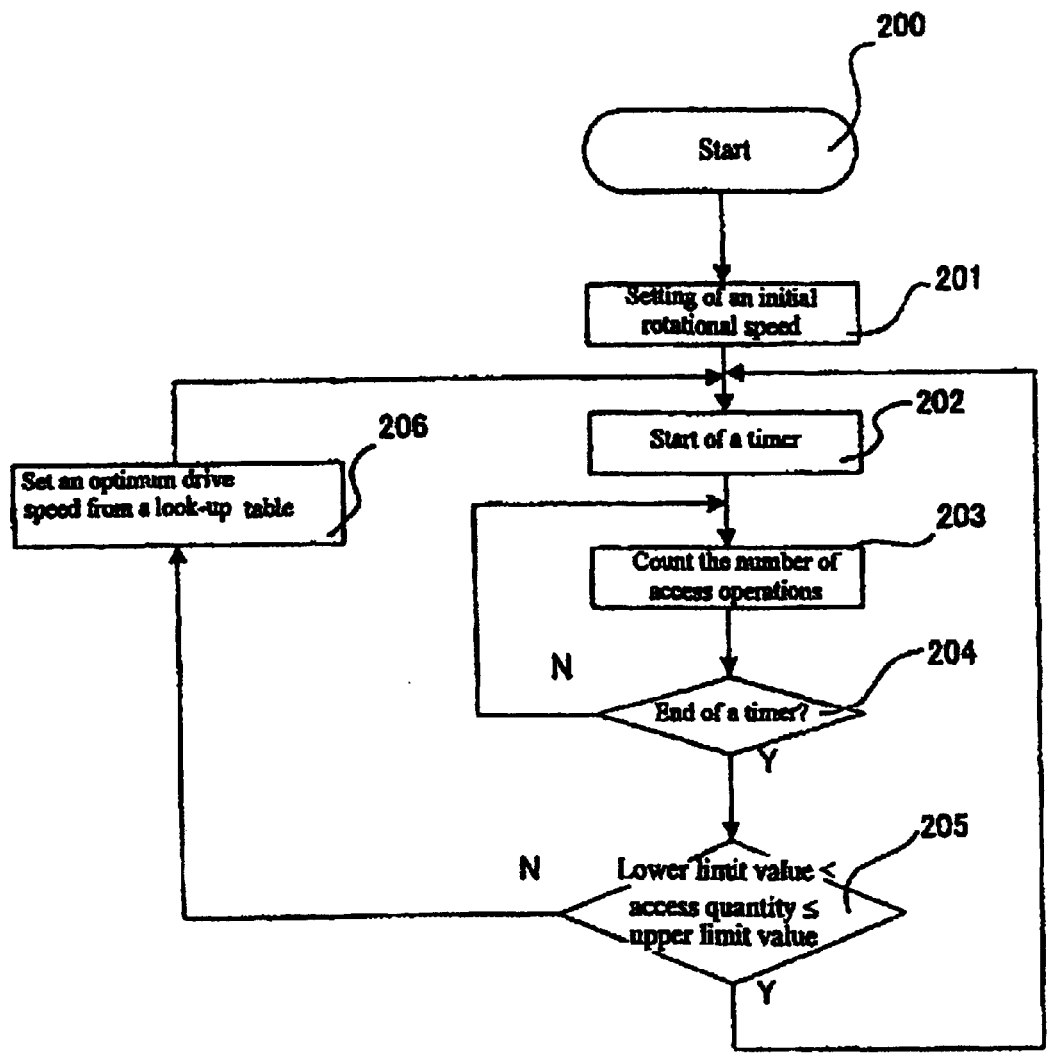
FIG. 8 is a flowchart for a second embodiment of the disk drive control method of the present invention.

FIG. 8 is a flowchart for a second embodiment of the disk drive driving method of the present invention that is used in the disk drive shown in FIG. 5. The disk drive driving method of the present invention shown in FIG. 8 starts with step 200. In step 201, the disk drive is rotated at a predetermined drive speed, for example, the highest drive speed. In step 202, the timer means 29 included in the system controller 25 is started. In step 203, the number of operations of accessing the optical disk 10 is counted over a time set by the timer means 29.

In step 204 it is judged whether or not the predetermined time set to the timer means 29 has elapsed. If it has not elapsed, the process returns to step 203, in which the number of access operations is counted again. On the other hand, if the predetermined time has elapsed (Y) in step 204, the process advances to step 205, in which it is judged whether the access quantity integrated during the predetermined time is greater than a lower limit value and it is less than or equal to an upper limit value.

In the case where the access quantity in step 205 is greater than the set lower value and it is less than or equal to the upper limit value (Y), the drive speed being set is held because the drive speed does not need to be changed. On the other hand, in the case where the access quantity in step 205 is less than the set lower value or it is greater than the upper limit value (N), the process advances to step 206, in which an optimum drive speed is set from a look-up table shown in FIG. 9, that is, a media corresponding table. The process returns to step 202 and repeats steps 203 to 205 so that the access quantity is greater than the lower limit and that it is less than or equal to the upper limit value.

In the flowchart shown in FIG. 8, the process sets a drive speed and then returns to step 202 to restart the timer means 29. The quantity of accessing the optical disk 10 is again counted for the predetermined time, and the drive speed is changed until a judgment of "YES" is obtained in step 205. In either case, data can be reproduced at a suitable drive speed by controlling the drive speed until the judgment of "YES" is obtained in step 205.

Figure 9:
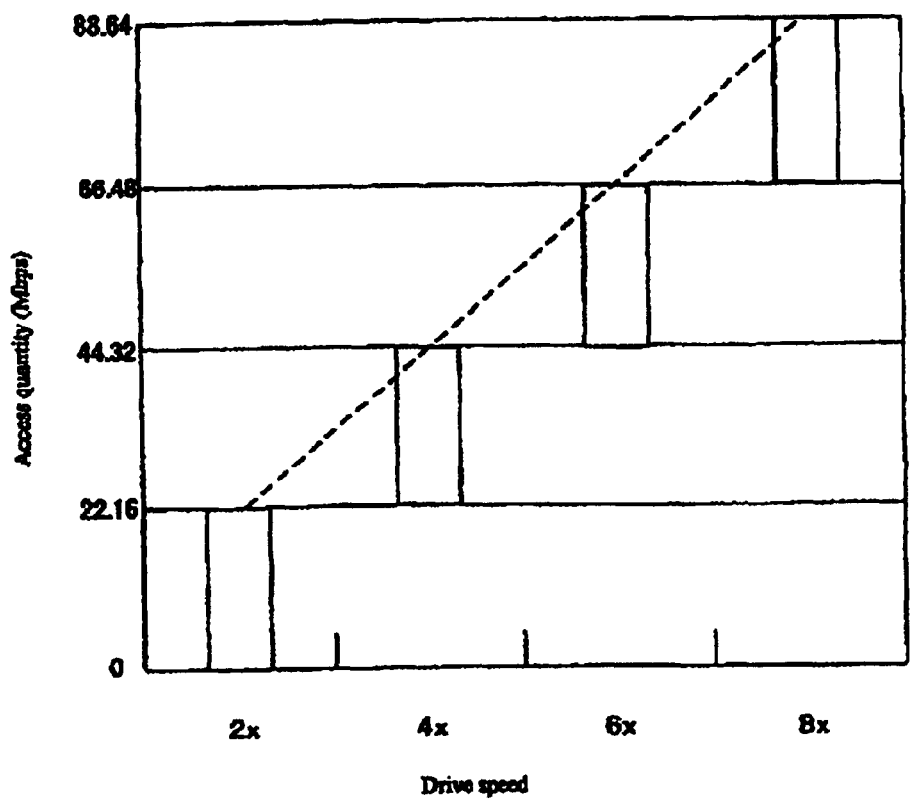
FIG. 9 is a diagram showing a relationship, in the present invention, between an access quantity and a drive speed.

FIG. 9 is a diagram showing the relationship, in the disk drive control method of the present invention shown in FIG. 8, between an access quantity and a drive speed. The media corresponding table corresponds to that used in step 206 shown in FIG. 8. Also, the vertical axis represents an access quantity (Mbps) detected by the system controller 25, while the horizontal axis represents a drive speed for a DVD in the unit of a double speed. As shown in FIG. 9, the upper limit value and lower limit value of each access quantity are judged, and a disk drive is driven at a predetermined drive speed. In the relationship, shown in FIG. 9, between an access quantity and a drive speed, an access quantity corresponding to a double speed is 22.16M bits/s, and an access quantity corresponding to a 4-time speed is 44.32M bits/s. This is shown by a broken line in FIG. 9.

Figure 10:
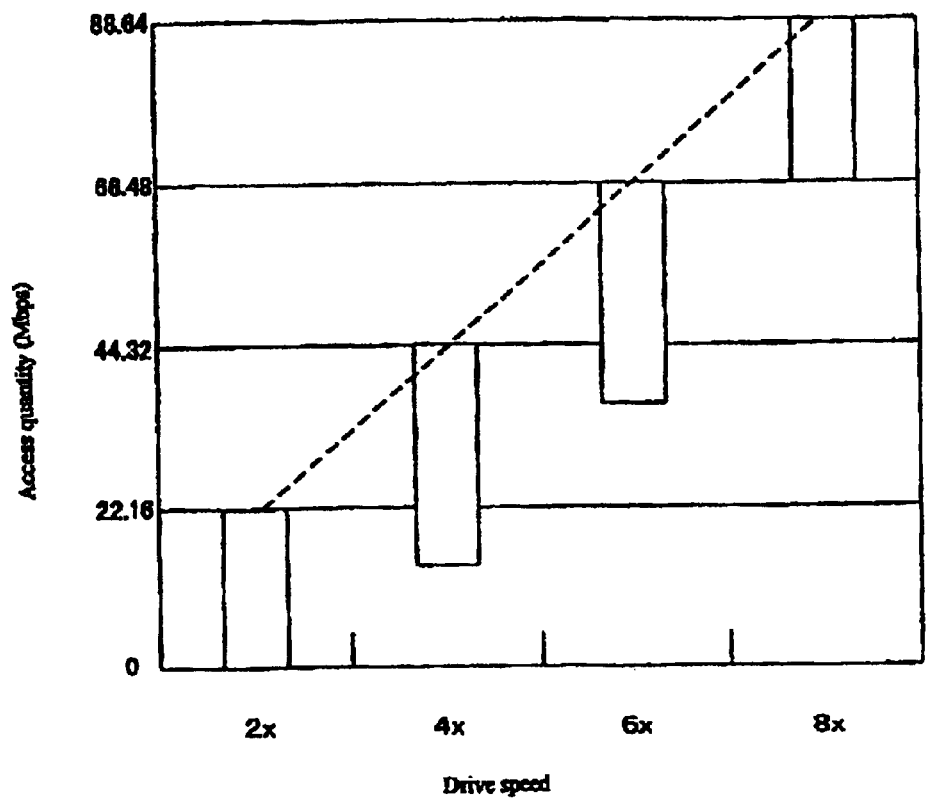
FIG. 10 is a diagram showing a relationship, in the present invention, between an access quantity and a drive speed.

FIG. 10 is a diagram showing the relationship between an upper limit value and a lower limit value, in step 205 shown in FIG. 8. In the relationship between an access quantity and a drive speed shown in FIG. 10, the lowest drive speed is set to a double speed. The upper limit values of access quantities are set to predetermined values, such as 22.16M bits/s, 44,32M bits/s, and 88.64M bits/s at the set drive speeds.

The range of access quantities shown in FIG. 10 is constructed so that the upper and lower limit values overlap each other between adjacent drive speeds. A buffer region for an access quantity is formed so that an optical disk can always be driven at a drive speed higher than a set drive speed by one step without frequently changing the set drive speed. In FIG. 9, the drive speed is set to a double speed, a 4-time speed, a 6-time speed, and an 8-time speed. However, the drive speed can be set to any speed, such as a 3-time speed, 5-time speed, 16-time speed, 32-time speed, etc.

Figure 11:
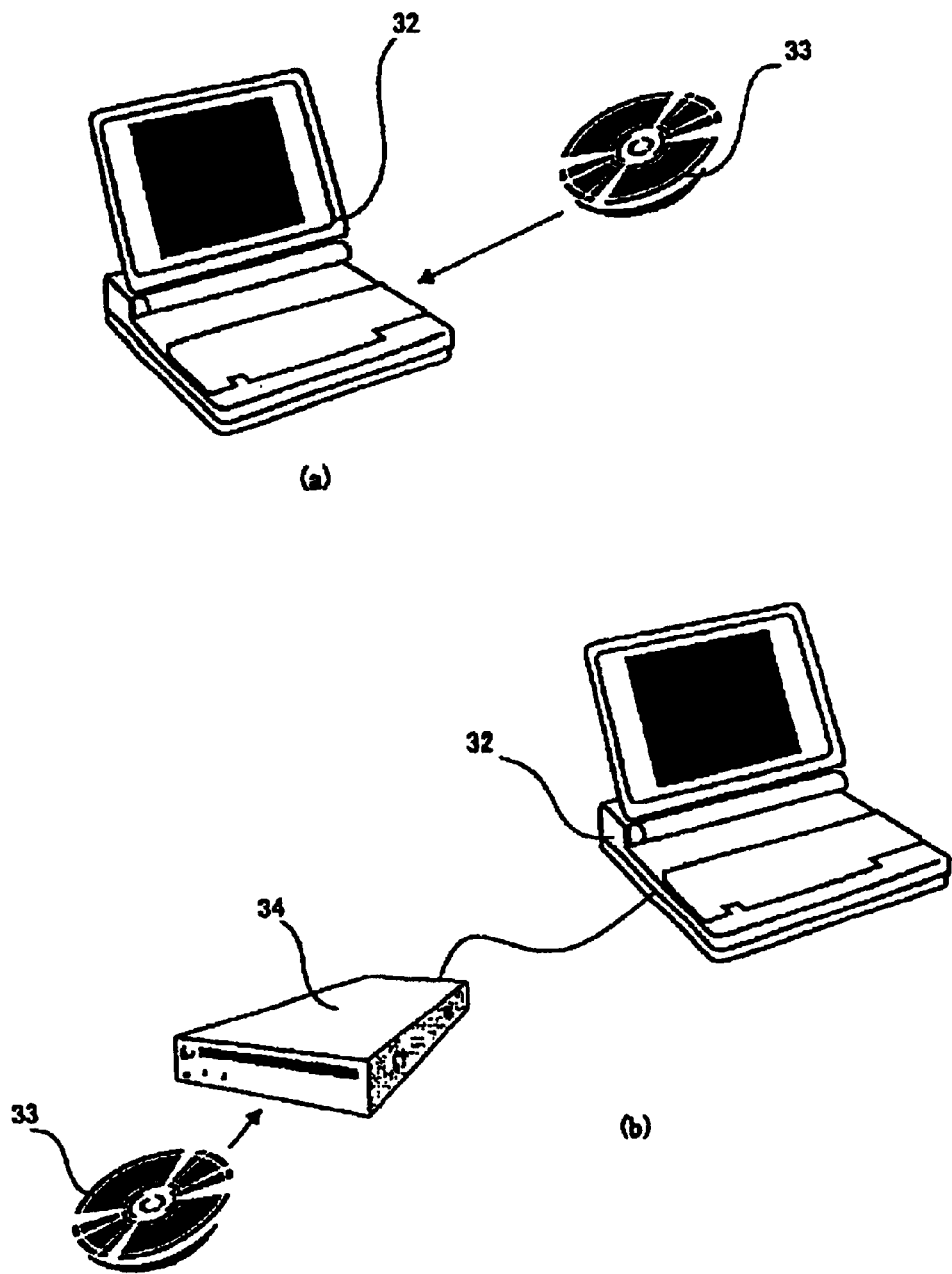
FIG. 11 is a perspective view showing an embodiment of an information processor of the present invention.

FIG. 11 is a diagram showing an embodiment of an information processor of the present invention. The information processor shown in FIG. 11A is constructed of a personal computer (PC) 32, in which the disk drive of the present invention is housed in the housing. In the information processor of the present invention, a user for the PC 32 is inserted an optical disk (e.g., a CD or DVD) 33 into the PC 32. If the PC 32 detects that the optical disk 33 has been inserted, in the disk drive control method of the first embodiment of the present invention the disk drive is first driven at the lowest drive speed. For this reason, the occurrence of unpleasant noise can be prevented, and in addition, power consumption can be reduced because the rotational speed of the spindle motor is low.

In the case where the optical disk contains format identification information, it is read out while the disk drive is being driven at the lowest rotational speed. On the other hand, when the optical disk contains no format identification information, the information actually read out is analyzed to judge the information format. Then, the drive speed is set to the optimum rotation speed according to the flowchart shown in FIG. 4, and reproduction is started.

In the case where the disk drive control method of the second embodiment of the present invention is used, the PC 32 of FIG. 11A having detected the insertion of the optical disk 33 needs to read a large quantity of data in the initial stage of operation by the buffer. Because of this, an access quantity is detected, while the optical disk 33 is being driven at the highest drive speed only for a short time. Then, the drive speed is gradually reduced according to the flowchart shown in FIG. 8 so that it corresponds to an access quantity. In the present invention, in the case where there is no need to take an initial read speed into consideration, the drive speed can also be increased in sequence from the lowest speed up to its suitable speed. For this reason, as with the disk drive control method of the above-mentioned first embodiment of the present invention, unnecessary noise can be prevented and power consumption can be reduced.

FIG. 11B shows an embodiment where a disk drive 34 of the present invention is attached to the PC 32 through a cable. While as shown in FIG. 11B, in FIG. 11A, the disk drive of the present invention is incorporated into the information processor, as shown in FIG. 11B, the disk drive can also be attached to the PC 32 through a USB port, etc., by the use of a suitable interface such as SCSI. In addition, in the present invention, the disk drive does not always need to be driven from the lowest speed, as described above. It is also possible to set the drive speed to the most frequently used speed.

Furthermore, a program for executing the disk drive control method of the present invention can be written with any language, for example, an object-oriented C language. The program can be stored in a wide variety of computer readable storage media, such as magnetic tape, a floppy disk, a hard disk, a CD-ROM, an magneto-optic disk, a DVD, etc.

While the present invention has been described in detail with reference to the illustrated embodiments employing an optical disk, the present invention is not limited to the optical disk. For instance, the present invention is also applicable to storage means, such as a hard disk, whose rotational speed needs to be controlled. Also, although the present invention has been described in detail with regard to the read-only optical disk, the present invention is likewise applicable to read/write optical disks.

What is claimed is:

1. In an information processor for reading out or writing information from or to a disk drive, a method of controlling said disk drive, which includes disk drive means for driving a disk, access means for reading out or writing information from or to said disk, control means for controlling said disk drive means, and a disk controller including means for storing a table of information, comprising the steps of: driving said disk drive at a set drive speed; acquiring format identification information from information recorded on said disk setting said drive speed using said table in which said format identification information and said drive-speed information are correlated with each other and further including determining said drive-speed information from a quantity of accessing said disk by use of said table; and transmitting drive-speed information for said disk drive, determined from said acquired format identification information.

2. The disk control method according to claim 1, wherein said step of setting said drive speed includes a step of transmitting said drive-speed information, determined by using said table, from said information processor to said disk controller.

3. The disk drive control method according to claim 1, wherein said disk drive is an optical disk drive.

4. A disk drive to be accessed by an information processor for reading out or writing information, comprising: means for rotating a disk; access means for reading out or writing information from or to said disk; control means for controlling said disk rotating means; a disk controller including means for storing a table of information in which said format identification information and said drive-speed information are correlated with each other; means for driving said disk drive at a set drive speed; means for acquiring format identification information from information recorded on said disk means for setting said drive speed using said table in which said format identification information and said drive-speed information are correlated with each other and further including means for determining said drive-speed information from a quantity of accessing said disk by use of said table; and means for transmitting said drive-speed information determined from said acquired format identification information to said disk driving means.

5. The disk drive according to claim 4, wherein said information processor includes means for receiving said drive-speed information, which is determined from said table, from said information processor.

6. The disk drive according to claim 5, wherein said table is included in said disk drive.

7. The disk drive according to claim 4, wherein said disk is an optical disk.

* * * * *